July 27, 1926.

L. G. HILL 1,594,200

GREASE GUN

Filed Nov. 16, 1921

INVENTOR.
Louis G. Hill
BY
King Harness
ATTORNEY.

July 27, 1926.  L. G. HILL  1,594,200
GREASE GUN
Filed Nov. 16, 1921    2 Sheets-Sheet 2
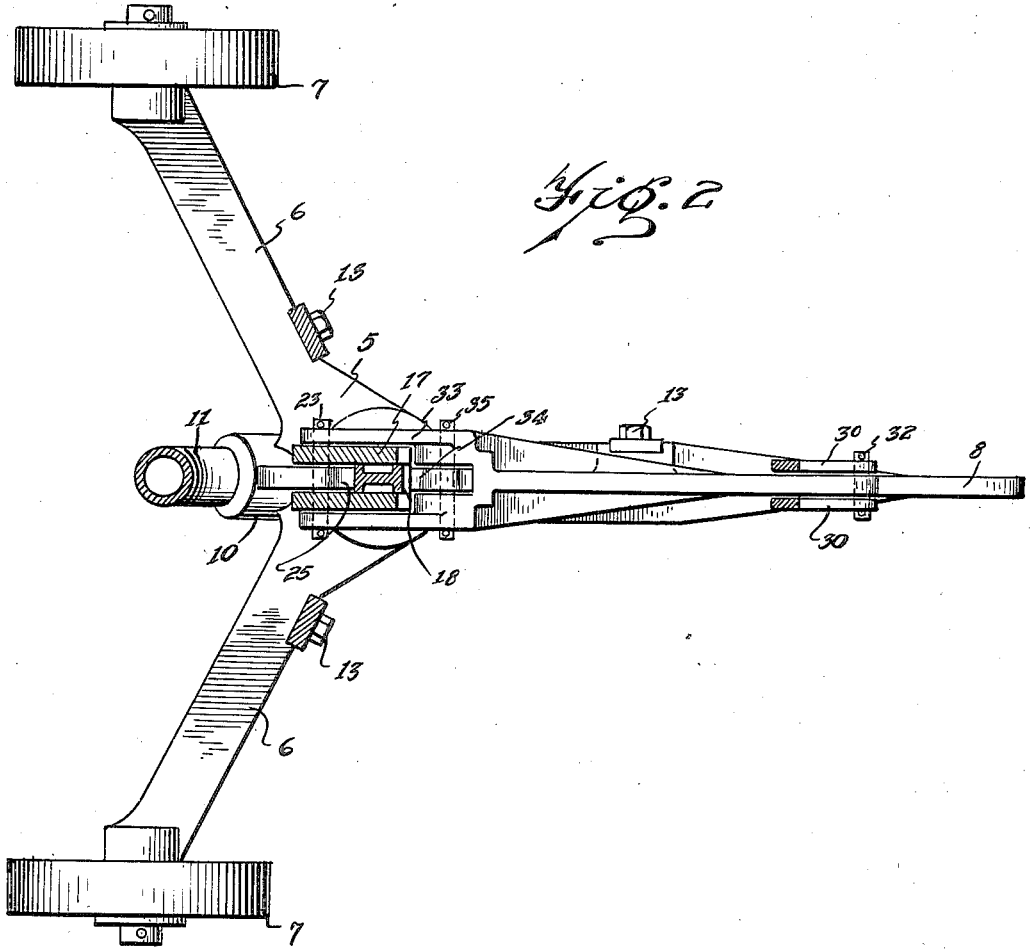
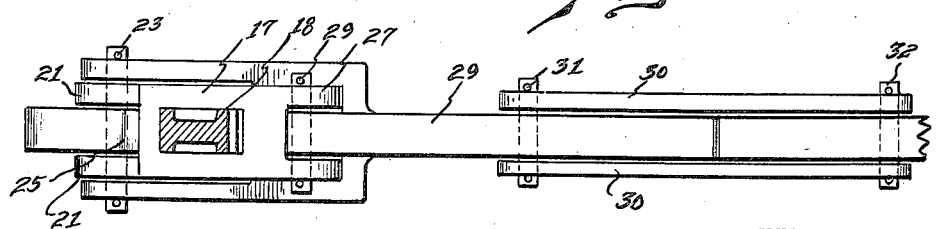
INVENTOR.
Louis G. Hill
BY
Hing Harness
ATTORNEY.

Patented July 27, 1926.

1,594,200

UNITED STATES PATENT OFFICE.

LOUIS G. HILL, OF MORENCIE, MICHIGAN.

GREASE GUN.

Application filed November 16, 1921. Serial No. 515,449.

My invention relates to a grease gun for use in filling transmission and differential housings in automobiles, and is particularly designed for use in garages and service stations.

This application is a continuation in part of my application Serial No. 483,183, filed July 8th, 1921, for a similar device.

One of the disadvantages of the grease guns now in use is that the operator becomes smeared with grease and dirt in the operation of the same and is also greatly hampered by reason of the fact that the grease must be stored in large barrels or similar containers removed from the point where it is to be used in the filling of automobile transmission and differential housings.

It is one of the objects of my invention to provide a grease gun of a portable nature and which will carry with it enough grease to fill a number of such housings and which may be easily taken from place to place as occasion requires.

It is another object of my invention to provide such a device so constructed that it may be easily and quickly operated without the operator being compelled to become covered with dirt and grease.

It is another object of my invention to provide a container for use in grease guns which may be easily and quickly removed and which will serve to supply a number of transmission and differential housings of automobiles.

A still further object of my invention is to provide such a combined device of simple and inexpensive construction.

These and other objects and advantages are shown in the arrangement, combination and construction of the various parts of my improved device as described in the specification, claimed in my claims and shown in the accompanying drawings, in which:

Fig. 2 is a top plan view of the same, showing the operating means in section on the line 2—2 of Fig. 1.

Figure 1:
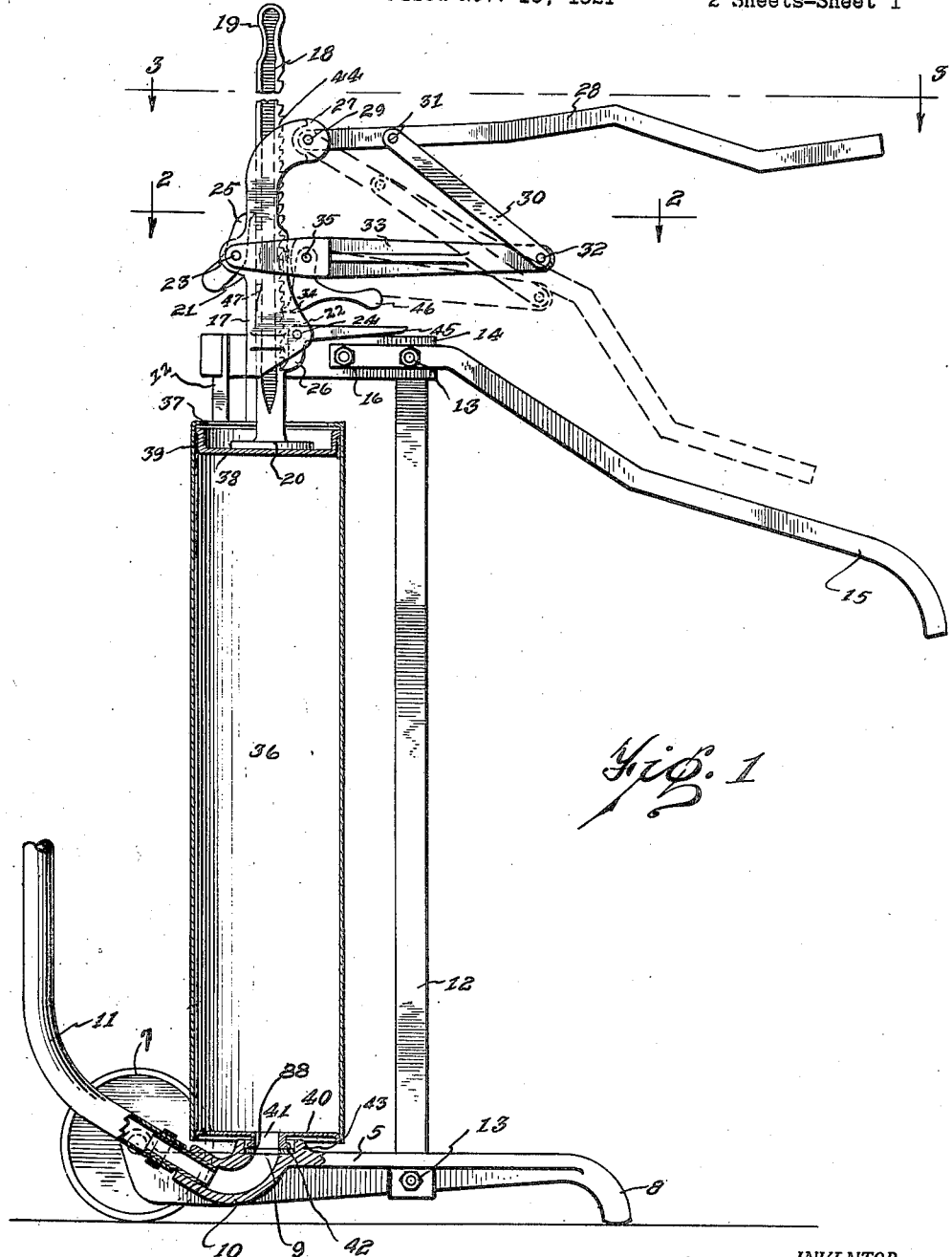
Fig. 1 is an elevation of my improved grease gun, showing one of my removable containers therein.

Fig. 3 is a view taken on line 3—3 of Fig. 1.

In the construction of my improved device, I provide a base 5 having arms 6 extending therefrom. On the ends of two of the arms 6, I provide wheels 7 and on the end of the third arm, I provide a foot 8.

The base 5 has an aperture 9 therein and an extension 10 leading therefrom. The extension 10 is centrally apertured so that a passageway is formed through the aperture 9 of the base 5 and the extension 10. I connect a hose 11 to the extension 10 in any suitable manner.

Rods 12 are secured to the arms 6 by means of the nuts 13 and extend upwardly to a head member 14 to which they are secured by similar nuts 13 so that the head member 14 is suspended on the rods 12.

A handle 15 is secured to the head member 14 by means of the nut 13 and the nut 16 so that my improved device may be pulled or pushed about from place to place.

The head member 14 has an extension 17 within which is partially enclosed a toothed plunger 18 having a hand grip 19 on its upper end and a flared foot 20 on its lower end.

The extension 17 has an ear 21 and an ear 22 to which are pivoted through the pivot pins 23 and 24 respectively, the dogs 25 and 26. The extension 17 also has an ear or bracket 27 to which the lever 28 is pivoted at 29. A second lever 30 is fixed to the lever 28 at 31 and is pivoted at 32 to a lever 33, which lever 33 is pivoted to the ear 21 through the pivot pin 23. Another dog 34 is pivoted to the arm 33 through the pivot pin 35.

I also provide a grease container 36 whose upper end is provided with a flange 37 to prevent the removal of the top 38 through the upper end of the container 36. The top 38 has a packing ring 39 around its outer edge to prevent the extrusion of grease around its edges. The container 36 is also provided with a bottom 40 which may be welded or otherwise fixed in place or press fitted so as to make it removable. The bottom 40 has a central aperture 41 therein and a nub 42 extending therefrom with a packing ring 88 thereon and adapted to fit within the socket 43 on the base 5. The opening 41 in the bottom 40 and the opening 9 in the base 5 are thus brought into alignment so that the grease may pass therethrough into the hose 11.

In the practical operation of my improved device, it will be seen that with the grease container in place, downward pressure on the lever 28 will cause the dog 34 to push downwardly the plunger 18 by reason of the engagement of the dog 34 with the teeth 44 on the plunger 18 with the consequent result that the flanged foot 20 will be pressed downwardly upon the top 38 of the grease container 36 and the grease within the container 36 will be extruded through the openings 41 and 9 through the hose 11 and thence into the automobile differential, transmission housing or other part which it is desired to furnish with grease. The dotted lines in Fig. 1 show in detail the operation of the levers 28, 30, and 33, when forcing grease out of the container 36.

When the dog 34 has been depressed to its full length, the lever 28 is raised so that the dog 34 will obtain a new "bite." The dog 26 which is in constant engagement with the teeth 44 will prevent the plunger 18 from springing upwardly while this new "bite" is being taken. This is of great utility for the reason that when pressure is released from the flanged foot 20, the grease will tend to expand and push the top 38 upwardly.

This operation is continued until the container has been emptied when the operator will push upwardly on the handle 45 of the dog 26 until the handle 45 engages the handle 46 on the dog 34 so that both the dog 26 and the dog 34 will be disconnected from the teeth 44, when the operator will grasp the hand grip 19 on the plunger 18 and lift the plunger 18 upwardly until the dog 25 engages the notch 47 on the plunger 18, holding the plunger in an elevated position and free of the container 36.

It is then possible to remove the container 36 from the device through the space between the rods 12 and a new container filled with grease is placed therein, whereupon the dog 25 is released from the notch 47 and the plunger 18 allowed to move downwardly until the flared foot 20 engages with the top 38 of the new container when the device is again ready to be operated.

It will thus be seen that I have provided a grease gun of simple and economical construction and which may be operated easily and quickly without the operator becoming smeared with grease. It will also be seen that my improved device is of a portable nature.

My improved grease container is of simple and rugged construction, may be shipped from place to place and easily refilled either through the opening 41 in the bottom 40 or by removing bottom 40 therefrom.

It is obvious that some changes may be made in the arrangement, construction and combination of my improved device without departing from the spirit of my invention and it is my intention to govern by my claims such changes as may be contained within the scope thereof.

What I claim is:

1. A device of the class described, comprising a base member and a head member adapted to receive a grease container having a movable top therein and a bottom having an apertured projection extending therefrom, said base having a socket therein adapted to engage said apertured projection and an aperture through said base and within said socket adapted to cooperate with the aperture in said projection to form a passageway for grease, and means for forcing grease from said container through said openings.

2. A device of the class described, comprising a base member, supports extending therefrom for holding a head member at a predetermined distance from said base member, a plunger on said head member, said members being adapted to receive a grease container loosely positioned between them, means for exerting pressure upon said container through said plunger, a flexible hose communicating with the container for receiving grease therefrom under pressure from the plunger, and means for holding said plunger free of said container to thereby permit free removal of said container from between said base and head member.

3. A device of the class described, comprising a base member and a head member adapted to receive a grease container, an arm extending from said head member and partially enclosing a toothed plunger adapted to engage said container, a lever pivoted to said arm and a second lever fixed to said first lever, a third lever pivoted at one end to said second lever and at its other end to said arm, a dog on said third lever adapted to engage the teeth on said plunger and to cause downward movement of said plunger when said first lever is pulled downwardly.

4. A device of the class described, comprising a base member and a head member, adapted to receive a grease container, an arm extending from said head member and partially enclosing a toothed plunger, adapted to engage said container, a lever pivoted to said arm and a second lever fixed to said first lever, a third lever pivoted at one end to said second lever and at its other end to said arm, a dog on said third lever adapted to engage the teeth on said plunger and to cause downward movement of said plunger when said first lever is pulled downwardly, and a second dog pivoted to said arm and adapted to engage the teeth of said plunger, so as to prevent upward movement of said plunger when said first lever is moved upwardly.

5. A device of the class described, comprising a base member and a head member, adapted to receive a grease container, a plunger in said head member and adapted for engagement with said grease container, means for exerting downward pressure upon said plunger to cause extrusion of grease from said container, a flexible hose communicating with the container to receive such greases, and means for holding said plunger in place when said downward pressure is removed.

6. A device of the class described comprising a base and a grease outlet leading from said base, grease confining means communicating with said outlet, a movable ejecting element, said gun being adapted to receive a removable grease container having an outlet positioned between the base and said ejecting element, and manually operable means for progressively operating said ejecting element to co-act with a movable wall of the container to eject grease therefrom through the discharge opening in the base of said gun, and means for making a tight joint between the base and container outlet.

LOUIS G. HILL.